United States Patent [19]

Bryant

[11] 4,335,523
[45] Jun. 22, 1982

[54] TOOL FOR ADJUSTABLY ALIGNING PIPE FLANGES AND STRUCTURAL MEMBERS

[76] Inventor: Gladys M. Bryant, 6515 E. Compton Blvd., Paramount, Calif. 90723

[21] Appl. No.: 227,663

[22] Filed: Jan. 23, 1981

[51] Int. Cl.³ .............................................. G01C 9/28
[52] U.S. Cl. ........................................................ 33/371
[58] Field of Search ............................. 33/370–373, 33/347, 384; 411/412, 413

[56] References Cited

U.S. PATENT DOCUMENTS

| | | | |
|---|---|---|---|
| 1,891,573 | 12/1932 | Phelps | 33/384 |
| 2,358,564 | 9/1944 | Donaldson | 33/371 X |
| 2,531,799 | 11/1950 | Zumwalt | 33/370 X |
| 3,402,613 | 9/1968 | Neusel et al. | 411/413 |
| 3,499,225 | 3/1970 | Darrah | 33/347 |
| 3,822,481 | 7/1974 | Doan | 33/371 |
| 4,133,115 | 1/1979 | Stockholm | 33/371 |

OTHER PUBLICATIONS

"Dial Angle Flange Level" by Curv-O-Mark, form 5-300 stock #20.

Primary Examiner—Charles E. Phillips
Attorney, Agent, or Firm—Donald D. Mon

[57] ABSTRACT

A tool for selectively angularly aligning an apertured flange so that the flange can be fixed to a pipe at a selected angularity relative to bends in the pipe. Improved device for attaching the level to the flange are shown, and the level can further be provided with means enabling it readily to be used also to set the grade of a pipe or of a structural member.

14 Claims, 9 Drawing Figures

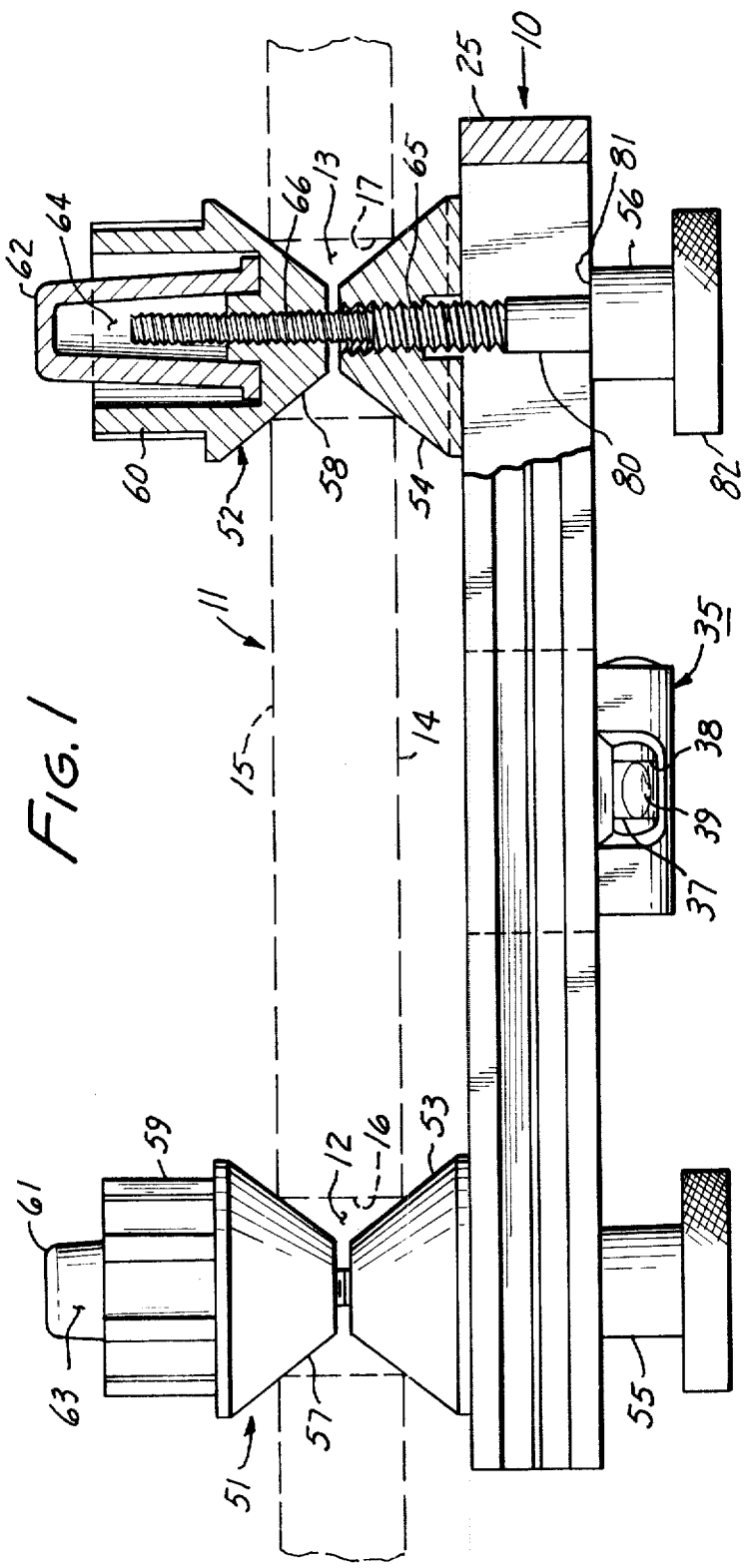

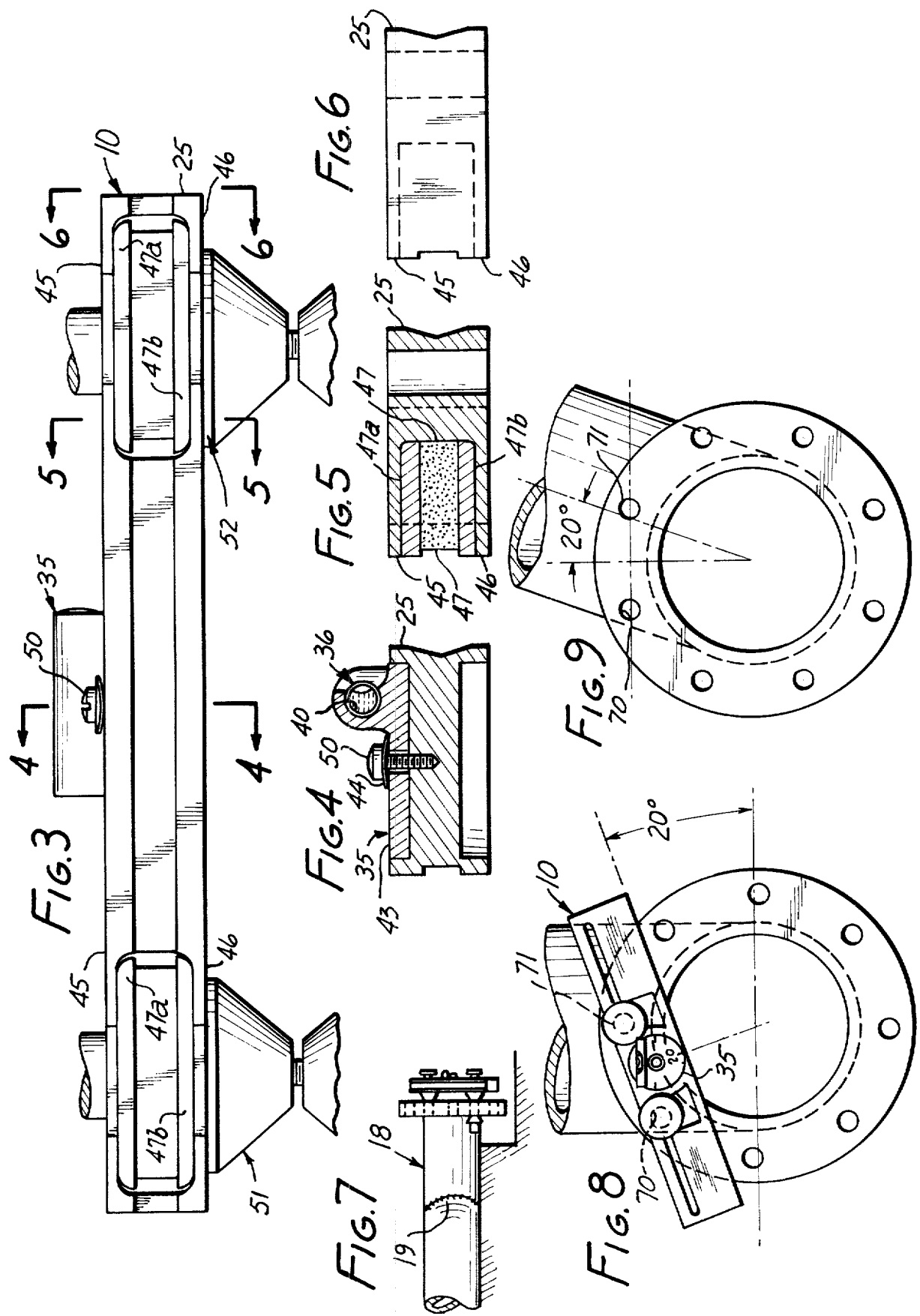

TOOL FOR ADJUSTABLY ALIGNING PIPE FLANGES AND STRUCTURAL MEMBERS

FIELD OF THE INVENTION

This invention relates to the fitting and laying of pipe, and especially to a tool for conveniently establishing the correct angular alignment of a flange which is to be fixed to a pipe.

BACKGROUND OF THE INVENTION

In the fitting up and laying of large-diameter pipe, where apertured pipe flanges are welded to respective lengths of pipe, and then adjacent pipe flanges are bolted together, the correct angular alignment of the pipe flanges is essential or they cannot be joined by bolts. This represents no particular problem when two straight unbent lengths of pipe are to be joined, because the entire length of one pipe can be rotated so the apertures in the pipe flanges line up, and then the flange at the other end can be welded on, and the process repeated. It is not so simple, however, when one of the pipes has a joint in it that forms an angle, or when both of them do.

It is extremely inconvenient to weld a pipe flange onto a pipe with the pipe already installed in its ultimate installed position. It is better practice to lay the jointed pipe flat on the floor, and do the job in a shop. Or, if the job is done in the field, it is better practice to perform the task at ground level. However, there is a more complicated angular relationship, when the pipe is bent than when it is straight, because when the jointed pipe is erected, the pipe flange will have rotated. Accordingly, when a pipe flange is attached to a length of bent pipe, allowance must be made for the change in spatial alignment which will result when the pipe is erected in its ultimate position.

An object of this invention is to provide a tool for angularly aligning a pipe flange relative to a pipe which is easy to use, and accurate in its results.

DISCUSSION OF PRIOR ART

The task of aligning pipe flanges is not a new one, and tools have been designed to accomplish this function. An example is the "Dial-Angle-Flange-Level" distributed by Contour Sales Corporation, 6515 East Compton Blvd., Paramount, Calif. 90723, shown in its publication Form S-300. This device has a bar which is attachable to a pipe flange at two apertures thereon, and an angularly adjustable protractor dial bubble level. Two cylindrical pins are attached to the bar and project therefrom. Their spacing apart is adjustable. In use, the pins are inserted into holes in the flanges. The accuracy of the alignment depends in part on how closely these pins fit in the flange holes, or if they are loose in the flange holes, how similar is their position in the holes. In the same publication there is shown a "Pro-Mag Level" which has magnets to hold a body in axial alignment with a pipe, and an angularly adjustable bubble level.

U.S. Pat. No. 3,822,481, issued to Doan on July 9, 1974 shows a bubble level which is attachable to a flange by attachment means at two flange apertures, the level not being angularly adjustable. The attachment means include tapered bodies, but neither is threaded for positive attachment and alignment.

The Contour Sales Corporation items have been on sale more than one year prior to the date of filing this application. The Doan patent is more than one year old as of that date.

BRIEF DESCRIPTION OF THE INVENTION

The tool according to this invention comprises a body, a protractor dial bubble level adjustably rotatably attached to said body, and a pair of attachment means aligned with one another along a datum line related to the bubble level. Each attachment means includes a pair of self-centering members, one of which is movable toward the other, so as to clamp the body to the flange. The self-centering members are proportioned to enter the apertures so as to center themselves and thereby align the body with the apertures. A movable one of the members is threadedly attached to a bolt which is coaxial with both of the members.

According to a preferred but optional feature of the invention, edges of the body are parallel to a datum line drawn through the centers of the self-centering members so those edges are related to the bubble level when the device is used to set the grade of a pipe or structural member.

According to another preferred but optional feature of the invention, the bubble level is mounted to the body via a protractor dial, the bubble level being fixed to the dial, and the dial being rotatable, and provided with means to restrain it in a selected angular position.

According to yet another preferred but optional feature of the invention, at least one of the attachment means is attached to the body in a slot aligned with the datum line so the body can be attached at apertures which have various spacings apart, one of the self centering members being threaded onto the bolt so as to hold the attachment means at a selected position.

According to yet another optional feature of the invention, the body can be provided with magnet means to hold it in axial alignment on a pipe or structural member or the like, to enable the grade to be set, and thereby to increase the number of useful functions the tool can perform.

The above and other features of this invention will be fully understood from the following detailed description and the accompanying drawings, in which:

BRIEF DESCRIPTION OF THE DRAWINGS

FIG. 1 is a top view partly in schematic notation showing the presently preferred embodiment of the invention attached to a pipe flange;

FIG. 2 is a face view of the device of FIG. 1;

FIG. 3 is a bottom view of the invention;

FIGS. 4, 5 and 6, are cross-sections respectively taken at lines 4—4, 5—5 and 6—6 in FIG. 3;

FIG. 7 shows a pipe flange alignment problem; and

FIGS. 8 and 9 are schematic views illustrating how this invention solves the problem.

DETAILED DESCRIPTION OF THE INVENTION

In FIG. 1 there is shown a level 10 according to this invention attached to a pipe flange 11. The flange has a pair of apertures 12, 13 therethrough. Of course the usual pipe flange has more than two apertures, and FIG. 1 merely shows that a selection of two has been made for alignment purposes. Ordinarily two adjacent holes will be selected, because it is common practice for two top holes to be aligned on a horizontal line on installed pump flanges, for example.

The pipe flange has opposite faces 14 and 15 which intersect the walls 16, 17 of the apertures. The apertures are circularly cylindrical holes.

The object of this invention is to align the pipe flange relative to a pipe 18 at a given angular relationship (see FIG. 7). The pipe often has a joint 19 therein which forms an angle in the pipe. After being properly aligned, the flange is welded to the pipe. The ultimate lay of the pipes, and the angular alignment of the flange at the other end of the jointed pipe, causes the angular relationship to be of importance, because if the angular alignment is not exact, then adjacent flanges cannot be joined by bolts because the holes in adjacent flanges will not be aligned. It is an object of this invention to enable a jointed (or bent) pipe to be placed in an arbitrary position, perhaps flat on the floor as shown in FIG. 7, and then to align the pipe flange so that when the pipe with the flange welded on to it is placed in its ultimate grade and location, the flange will be correctly aligned. An example of 20° has been shown as an objective in FIGS. 8 and 9, but that angle merely represents a size selected arbitrarily for disclosure. Any desired angle can be provided. The use of this device will be described in greater detail later in this specification.

Lever 10 includes a body 25 which is generally in the shape of a flat plate. It has a pair of lightening holes 26, 27 therethrough which can also be used to carry the level. Two aligned adjustment slots 28, 29 are formed along or parallel to a datum line 30. The width of the slots is close to the diameter of a bolt yet to be described. Top edge 31 and bottom edge 32 are parallel to datum line 30.

Between the two slots there is disposed a protractor dial bubble level 35 which is rotationally adjustable. It constitutes a liquid bubble assembly 36 with centering lines 37, 38 to indicate when a bubble 39 is centered. The bubble is formed in liquid inside a closed tube 40 that is related to protractor type indicia 41 which indicate angularity relative to a datum point 42 which is 90° removed from a line parallel to datum line 30. Of course, other indicia could be provided instead. Thus, the dial reading on the bubble level indicates the angularity of the tube 40 from the datum line 30 and thereby indicates the angularity of the body therefrom. More particularly, the bubble level assembly is fixed to a protractor plate 43 which is rotatably mounted to the body. The angle indicia are most conveniently carried by this protractor plate, but it will be understood that the protractor indicia could instead be applied to the body and an indicia mark could be carried in the plate instead.

The angular position of the bubble level is established by a screw fastener 50 which compresses a spring washer 44 against the plate and this presses the plate against the body to provide a frictional restraint to hold the protractor dial in an adjusted position. The screw also serves to mount the plate. Clearly, other mounting and adjustment means can instead be provided.

As best shown in FIGS. 4, 5 and 6, the bottom of the body if formed with two pairs of spaced apart, aligned shoulders 45, 46 which define bottom edge 32. A recess is formed between them to accomodate the surface of a pipe. Magnets 47 which include pole pieces 47a, 47b are placed so as to make portions of the body magnetic for holding it against the wall of a pipe or structural member when laid axially thereon. This is an optional feature of the invention which is quite useful. Top edge 31 is axially grooved for a similar purpose, and may or may not have a magnet.

Two attachment means 51, 52 are provided to hold level 10 to the pipe flange. These are best shown in FIG. 1 and each constitutes a first self-centering member 53, 54 threaded onto a respective bolt.

Bolts 55 and 56 are identical. Therefore only bolt 56 will be described in detail. It includes a cylindrical shank 80 which closely fits in slot 29. That is to say that the slot width and the diameter of shank 80 are as close as practicable, still permitting the bolt to slide along the slot. A shoulder 81 bears against one face of the body, and a head 82 is formed on that end of the bolt. A larger diameter thread 65 is formed on the bolt next to the cylindrical shank. It projects beyond the other face of the body. Then the first self-centering member can be threaded to it and tightened down onto it, so it abuts the body, and the bolt will thereby be held in a selected location along the slot. A smaller diameter thread 66 extends beyond thread 65 for engagement by the second self-centering member.

Of course, a tool can be made with one bolt and first member permanently located, and only one adjustably located, but it is convenient for both to be adjustable.

The term "self-centering member" is used herein to describe a body which is proportioned to enter an aperture and which, when brought against the end of the aperture, tends to assume a position coaxial with the aperture. Cones, frustrums of cones, and pyramids, are familiar examples. However, any structure with decreasing lateral dimensions and lateral symmetry sufficient for centering purposes, may also be used. The term "self-centering" is intended to be generic to all of them.

The second self-centering members are provided with hand grips 59, 60 with a relatively larger diameter so that a strong force can be applied to tighten them. In addition, speed grips 61, 62 are provided with a smaller diameter so that the second members can initially quickly be spun into place, thereafter using the hand grips 59 and 60 to tighten the assembly. The speed grips are provided in the form of dome-like bodies which provide spaces 63, 64 for the ends of the bolts to enter to protect the user from contact with the ends of these bolts, and to protect the threads from damage.

The use of this invention for its principal intended purpose of angularly aligning a pipe flange to be applied to a pipe is shown in FIGS. 7, 8 and 9. In FIG. 8 pipe 18 is shown in an arbitrarily selected position. In FIG. 7 the joint is shown laid down. In FIG. 8 it is shown vertically aligned. The purpose is to show that the pipe joint may be placed in any arbitrary position selected by the user, and then it is possible to determine the angular position of a flange relative to some datum level with the use of this tool. For example, in FIG. 8 two apertures 70, 71 have been selected, and the tool has been applied thereto. The tool has been set at 20° which is an arbitrarily selected angle. The flange has been rotated until the bubble is centered. This means that when the pipe is laid so that the joint is in some position 20° from the one which it occupied when the pipe flange was attached, the apertures will be appropriately located, often horizontally. This is shown in FIG. 9 where the pipe has been rotated 20°, taking the already-attached pipe flange with it, and apertures 70 and 71, instead of being at a 20° angle, are aligned horizontally. This or any other pre-selected value can be relied on for the manufacture and fitting of the next assembly i.e., the flange which is to be attached to it. It will thereby be seen that the construction illustrated enables the tool to be accurately centered relative to the holes by virtue of the use of the pair of self-centering members, and rigidly and reilably held in that position by the threaded attachment. The angle can be selected by rotating the bubble level 35 to a pre-selected notation.

In addition, this device can have the additional function of setting a pipe or a structural member to a grade or alignment simply by adjusting the rotatable level 35 to the pre-selected angle and applying the tool to the outside of the pipe or structural member. The shoulders align it, and the magnets hold it. While this feature has been suggested in the prior art, it has not been suggested in combination with the other features described herein.

It will further be noted that this tool is applicable to a wide range of aperture separations simply by loosening one or both of the attachment means relative to the body, and sliding the bolts along the slots to the correct position and then tightening them. The first self-centering members make a tight clamping fit to establish the separation of the attachment members, and the other self-centering members are tightened down to hold the tool to the flange. The device thereby constitutes a readily manufacturable, convenient to use, device which facilitates its intended functions.

The term "pipe" as used herein, also includes "tubing."

This invention is not to be limited by the embodiment shown in the drawings and described in the description, which is given by way of example and not of limitation, but only in accordance with the scope of the appended claims.

I claim:

1. A tool for adjustably determining the angular position of an apertured flange at the end of a pipe comprising:
   an elongated body having two slots therein extending parallel to a datum line;
   a pair of attachment means for attaching said body to said flange, each comprising a first self-centering member attachable to said body, a threaded bolt projecting beyond and coaxial with said first self-centering member, and a second self-centering member threaded to said bolt, and movable toward and away from said first self-centering member so they enter into respective apertures an clamp said tool to said flange; at least one of said bolts passing through said slot and closely fitting therein, and bearing against one side of said body, its respective first self-centering member being threaded to said bolt and bearing against the other side of said body to hold said bolt in a selected adjusted location along said slot;
   a rotationally adjustable protractor dial bubble level rotatably mounted to said body, said level including angular indicia means referrable to said datum line, and
   said first self-centering members being threadedly attached to a first thread on a respective bolt, said bolt including a head at the side of said body opposite from said self-centering members, the end remote from said head of each said bolt including a second, smaller diameter thread to which each respective second self-centering member is threaded, and each said second self-centering member including a first hand grip having a relatively larger diameter, and a speed grip having a relatively smaller diameter.

2. A tool according to claim 1 in which said bubble level is mounted by threaded means for exerting a force to restrain said bubble level in an adjusted position.

3. A tool according to claim 2 in which said threaded means includes a spring washer and a threaded screw which comprises said spring washer against said bubble level.

4. A tool according to claim 3 in which said bubble level is mounted to a plate bearing angular indicia, said spring washer bearing against said plate.

5. A tool according to claim 1 in which said indicia are applied to a rotatable plate which bears two ninety degree arcs divided into angular increments.

6. A tool according to claim 1 in which said bubble level is mounted for full 360° rotation.

7. A tool according to claim 1 in which said bubble level is rotatably bi-directionally movable through an arc of at least 90° both directions from a bubble setting which would indicate that the datum line is horizontal.

8. A tool according to claim 1 in which said bubble level is mounted by threaded means for exerting a force to restrain said bubble level in an adjusted position.

9. A tool according to claim 1 in which said speed grips are dome-shaped and are adapted to receive and cover the end of their respective bolts to protect them against damage.

10. A tool according to claim 9 in which said bubble level is mounted by threaded means for exerting a force to restrain said bubble level in an adjusted position.

11. A tool according to claim 1 in which said body includes an edge extending parallel to said datum line, and magnet means at said edge, whereby to attach to and align said body with the external wall of a pipe or structural member to determine its grade or alignment.

12. A tool according to claim 11 in which there are two of said slots, each of said bolts closely fitting in a respective slot.

13. A tool according to claim 11 in which said bubble level is mounted by threaded means for exerting a force to restrain said bubble level in an adjusted position.

14. A tool according to claim 11 in which said edge includes an axial recess enabling application of said body to the rounded surface of a pipe.

* * * * *